United States Patent [19]

Swartz et al.

[11] 4,369,361
[45] Jan. 18, 1983

[54] PORTABLE, STAND-ALONE, DESK-TOP LASER SCANNING WORKSTATION FOR INTELLIGENT DATA ACQUISITION TERMINAL AND METHOD OF SCANNING

[75] Inventors: Jerome Swartz, Stonybrook; Edward Barkan, South Setauket; Richard Bravman, Centereach; Frank Delfine, Farmingdale; Shelley A. Harrison, Dix Hills; Alexander M. Adelson, Peekskill, all of N.Y.

[73] Assignee: Symbol Technologies, Inc., Hauppauge, N.Y.

[21] Appl. No.: 133,945

[22] Filed: Mar. 25, 1980

[51] Int. Cl.³ ............................................. G06K 7/14
[52] U.S. Cl. .................................. 235/470; 235/454; 235/462; 235/463; 235/467
[58] Field of Search ............... 235/470, 454, 462, 463, 235/467; 350/241, 243; 340/146.3 SY, 146.3 F; 350/6.7, 6.8

[56] References Cited

U.S. PATENT DOCUMENTS

| | | | |
|---|---|---|---|
| 3,076,957 | 2/1963 | Hankes | 235/462 |
| 3,456,997 | 7/1969 | Stites | 235/467 |
| 3,728,677 | 4/1973 | Munson | 235/462 |
| 3,774,014 | 11/1973 | Berler | 235/467 |
| 3,812,325 | 5/1974 | Schmidt | 235/462 |
| 4,064,390 | 12/1977 | Hildebrand | 235/467 |
| 4,076,391 | 2/1978 | Triser | 350/241 |
| 4,097,729 | 6/1978 | Seugman | 235/467 |
| 4,135,663 | 1/1979 | Nojiri | 235/463 |
| 4,136,821 | 1/1979 | Sugiura | 235/454 |
| 4,180,204 | 12/1979 | Koenig | 235/454 |
| 4,210,802 | 7/1980 | Sakai | 235/462 |
| 4,251,798 | 2/1981 | Swartz | 350/6.7 |

Primary Examiner—Harold I. Pitts
Attorney, Agent, or Firm—Kirschstein, Kirschstein, Ottinger & Cobrin

[57] ABSTRACT

A portable, stand-alone, desk-top, laser scanning workstation includes a laser scanning head mounted above a support base. Objects bearing bar code symbols to be scanned are passed underneath the head for overhead scanning, or are passed along one side of the head for sideward scanning. The symbols are oriented face-up towards the handler all during their passage through the workstation to facilitate sighting and registration of the symbol with the laser light beam generated by the head. The workstation is self-supporting, is fully portable, can process objects of different sizes, and grants access to objects from either side of the workstation. The workstation is connected to a microprocessor-based microcomputer which is mounted within a desk-top console, as well as to a variety of peripheral devices such as a printer, a keyboard, a communications port, audiovisual annunciators and a data display. The workstation, console and peripheral devices all constitute an intelligent laser-based data acquisition terminal for use in a variety of applications.

58 Claims, 17 Drawing Figures

PORTABLE, STAND-ALONE, DESK-TOP LASER SCANNING WORKSTATION FOR INTELLIGENT DATA ACQUISITION TERMINAL AND METHOD OF SCANNING

BACKGROUND OF THE INVENTION

1. Field of the Invention

This invention generally relates to laser scanning systems for, and methods of, scanning, reading and/or analyzing bar code symbols. More particularly, this invention relates to a laser scanning workstation which is self-supporting on a support surface and which is portable from place to place due to its light-weight and small size and low volume characteristics. Still more particularly, this invention relates to a laser-based data acquisition terminal and to a novel method of reading bar code symbols.

2. Description of the Prior Art

Various laser scanning systems have been developed for many processing industries to read bar code symbols, which uniquely identify an object to be processed, to decode the symbol to a multiple digit representation for recordkeeping and inventory control purposes.

For example, blood-banks have begun to identify blood bags with bar code symbols to facilitate processing. The need has arisen to quickly and accurately scan coded blood bags.

Furthermore, the magazine distribution industry widely distributes magazines on a consignment basis, and therefore the need exists for accurately and quickly tallying the returned magazines for credit validation. Similarly, the record and tape industry requires accurate inventory information of its sold and returned products.

There are several laser scanning systems in current use. For example, there are point-of-sale or deck scanners which are large, massive and stationary installations which are built into an immovable structure such as a supermarket counter. In these scanners, the symbol must be oriented face-down during passage of the object through the system. Hence, it is difficult to register the symbol with the laser light beam emitted from the system.

Other systems include contact-type and non-contact-type wand or pen bar code readers which are positioned on or near the symbol, and then manually dragged across the symbol. However, criticality is required to manipulate the angle of the pen relative to the symbol, the pen speed, the pen pressure and the uniformity of pen speed. The pen readers are time-and labor-consuming.

Still other laser scanning systems have recently been designed which can be hand-held. However, the known hand-held laser scanning heads, although very light-in-weight, are not altogether convenient to use in assembly-line applications where the handler is processing coded objects all day long. In some applications, the hand-held heads are somewhat difficult to manipulate easily. In all cases, the hand-held laser scanning heads are required to be held by the handler, thereby restricting one of his hands from assisting directly in the manual processing of the objects to be scanned.

SUMMARY OF THE INVENTION

1. Objects of the Invention

Accordingly, it is the general object of the present invention to overcome the aforementioned drawbacks of the prior art.

Another object of the present invention is to provide a laser scanning workstation in which the bar code symbols on the objects are visible to the handler during passage of the objects through the workstation.

Still another object of this invention is to provide a laser scanning workstation in which the bar code symbols are easily registered with the emitted laser light beam.

An additional object of this invention is to scan bar code symbols from overhead, or from the side of a laser scanning head.

A further object of this invention is to provide a laser scanning workstation in which both of the handler's hands are free to manually pass the objects through the workstation.

Still another object of this invention is to provide a laser scanning workstation which is self-supporting and portable from one location to another.

Yet another object of this invention is to provide a laser scanning workstation which can scan objects of different sizes.

Another object of this invention is to provide a laser scanning workstation in which objects may enter the same from either side thereof.

A still further object of this invention is to scan a plurality of objects having their symbols lying in different orientations without requiring any pre-sorting of the objects.

An additional object of this invention is to provide a desk-top intelligent data acquisition terminal for controlling a variety of peripheral devices.

Still another object of this invention is to provide a novel method of reading bar code symbols in face-up orientation during passage of the coded objects through the workstation.

2. Features of the Invention

In keeping with these objects and others which will become apparent hereinafter, one feature of the invention resides, briefly stated, in a laser scanning workstation for, and novel method of, reading bar code symbols on objects passing through the workstation. The workstation includes a laser scanning head, a base mounted on a support surface, and means for mounting the head on, and at a predetermined elevation above, the base. The workstation supports itself on the support surface, to permit the handler to have both his hands free. The workstation is fully movable as a single unit from one location to another.

A laser light beam is generated within the head, and is directed along a light path through an outlet port formed in the head. The laser light beam is directed towards a bar code symbol which is located in the vicinity of a reference plane that is located exteriorly of the head. The laser light beam is cyclically swept across the bar code symbol for reflection therefrom, and the intensity of the reflected light is detected to generate an electrical signal which is processed electronically to generate a processed signal descriptive of the symbol.

The objects to be passed through the workstation are initially oriented with their bar code symbols facing upwardly towards the handler. The handler visually sights the symbol during passage of the object, and therefore the handler can easily register the symbol with the laser light beam.

In accordance with another feature of the invention, the objects pass underneath the head for overhead reading of the symbols. In the event that an object to be scanned, i.e. a filled test tube or the like, requires a vertical orientation during its passage through the workstation, then the head can be moved relative to the base to permit the test tube to pass in vertical orientation by a vertical side wall of the head for sideward reading of the symbol.

Another feature of the invention is that objects can enter the workstation from either side thereof. This feature accommodates both right- and left-handed handlers.

Still another feature of the invention is the capability of supportably positioning various differently-sized objects in the vicinity of the reference plane. This is particularly well suited for scanning such diverse objects as phonograph albums, tape cassettes and tape cartridges.

A further feature is to generate a multiple line scan pattern utilizing only a single scan element. Preferably, the scan element rotates and has a plurality of light-reflecting surfaces which are oriented at different angles of inclination relative to the axis of rotation of the scan element.

Yet another feature resides in generating a bi-orthogonal, L-shaped scan pattern by utilizing a single fixed mirror mounted in a skew manner relative to the base. The bi-orthogonal scan pattern assures that symbols of different orientations will be read without having to pre-sort the objects.

An additional feature resides in providing a microprocessor-based microcomputer within a desk-top console which is electrically connected to the workstation, as well as to a plurality of peripheral devices, such as a printer, a keyboard, a communications port, audio-visual annunciators, and a data display. The workstation, console and at least one of the peripheral devices all constitute an intelligent laser-based data acquisition terminal for use in a variety of applications.

Still another feature resides in shutting down the laser in the event of scanning motor or motor drive circuitry malfunction. This safety feature prevents the possibility of an object being scanned too slowly, or not at all.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
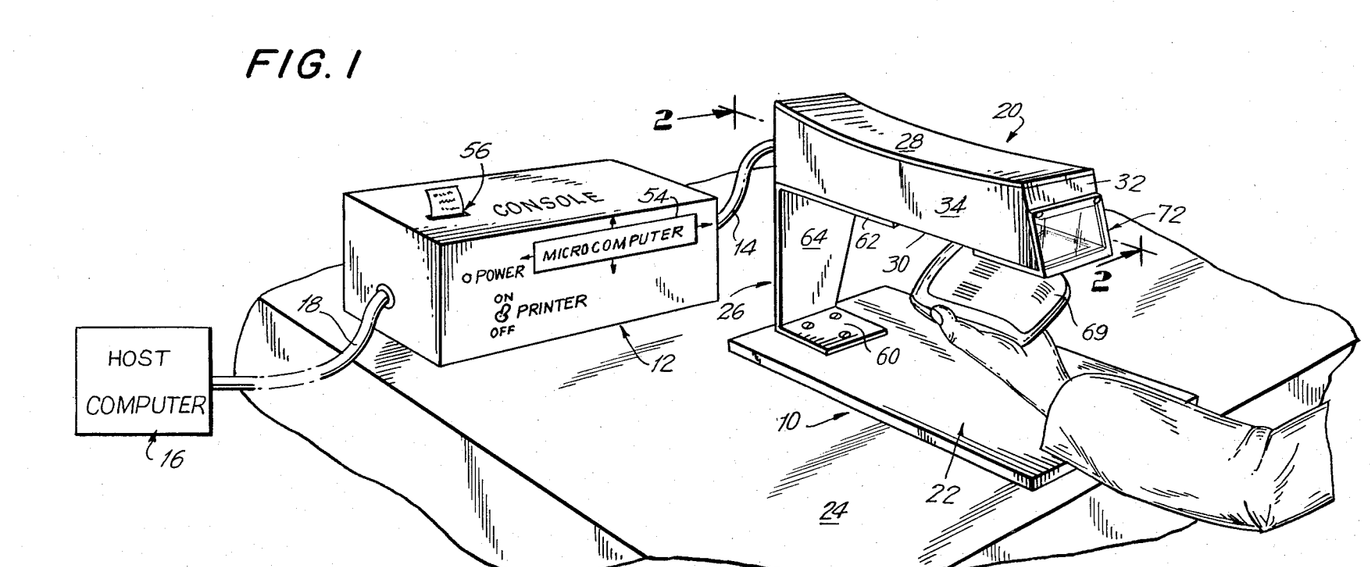
FIG. 1 is a part-perspective, part-schematic view of a laser-based data acquisition terminal of a laser scanning system including one embodiment of a stand-alone, desk-top laser scanning workstation particularly well suited for scanning coded blood bags in accordance with this invention.

Referring now to FIG. 1 of the drawings, reference numeral 10 generally identifies a portable, stand-alone, desk-top, laser scanning workstation for use in a laser scanning system operative for reading and/or analyzing bar code symbols. Such symbols comprise a series of lines and spaces of varying widths, which pattern decodes to a multiple digit representation characteristic of the object bearing the symbol. Typical symbol bar codes in current use are the Universal Product Code (UPC), EAN, Codabar, Code 39 and Code 2 of 5.

Turning again to FIG. 1, the laser scanning system includes the laser scanning workstation 10, a console 12 electrically connected to the workstation 10 by electrical cable 14, and a host computer 16 electrically connected to the console 12 by electrical cable 18.

Figure 2:
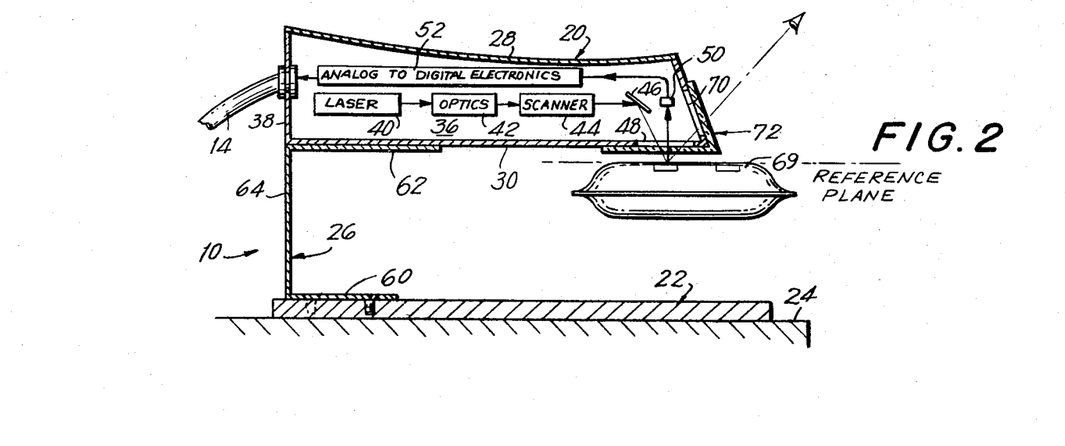
FIG. 2 is a part-schematic, sectional view of the laser scanning workstation as taken on line 2—2 of FIG. 1.

As best shown in FIG. 2, the laser scanning workstation 10 includes a laser scanning head or housing 20, a base 22 mounted on a support surface 24 such as a table top, and a mounting bracket 26 for mounting the head on and at a predetermined elevation above the base.

The housing 20 has a top wall 28, a bottom wall 30, a front wall 32, a pair of side walls 34,36 and a rear wall 38 which together bound an interior space. A miniature light source means 40 is mounted within the housing 20 for generating a laser light beam. A miniature optic means 42 is mounted within the housing 20, and is operative for directing the laser light beam along a light path towards the miniature scanning means 44, and thereupon to the fixed reflecting mirror 46 which reflects the laser light beam through the outlet port 48 which is formed in the bottom wall 30.

The scanning means 44 is mounted in the light path within the housing, and is operative for cyclically sweeping the laser light beam across a bar code symbol which is located in the vicinity of a reference plane that is located exteriorly of the housing 20. The reflecting mirror 46 is prefereably mounted within the housing so as to reflect the laser light beam from the scanning means 44 at from about 20° to about 25° relative to the vertical. The reflected laser light beam passes through the outlet port 48 and impinges on the bar code symbol at the reference plane for reflection from the symbol.

Miniature sensor means 50, such as a pair of photodetectors, is also mounted within the housing 20 for detecting the intensity of the light reflected from the bar code symbol, and for generating an electrical analog signal indicative of the detected intensity of the reflected light. The analog signal is then converted to a digital signal by analog-to-digital converter means 52 which is also mounted in the housing.

The digital signal is in turn converted to data descriptive of the scanned bar code symbol by a microprocessor-based microcomputer 54 which is contained within the console 12. The data descriptive of the bar code symbol may be recorded in tangible form by data recorder means or paper printer 56, also mounted on the console. The microcomputer 54 interprets the code of the symbol being read and decodes the symbol to the data descriptive thereof in accordance with a predetermined program which is easily changed from one application to another. The microcomputer 54 also generates control signals for controlling the operation of the printer 56, as well as other peripheral system components as described below. The microprocessor 54, the workstation 10 and the printer thereby constitute an intelligent laser-based data acquisition terminal. The microcomputer 54 may also be electrically connected to the remote host computer 16 for establishing two-way communication therewith. The host computer typically has additional memory storage for storing accounting information, and the microcomputer accesses the host computer for recordkeeping and inventory control purposes.

Additional details concerning the light source means 40, the optic means 42, the scanning means 44, the sensor means 50, the analog-to-digital signal processing means 52, and the digital-to-data function of the microcomputer means 54 are not believed to be necessary for an understanding of the present invention. Such additional details can be obtained from U.S. application Ser. No. 911,171, filed May 31, 1978, now U.S. Pat. No. 4,251,798 the entire contents of which are hereby incorporated by reference herein.

In accordance with this invention, the base 22 is a substantially planar plate which engages the support surface 24 over a broad surface area. The head-mounting bracket 26 includes a horizontal base flange 60 which is securely mounted on the base plate, a horizontal head flange 62 which is securely mounted on the bottom wall 30 of the housing, and an upright bracket part 64 which extends vertically intermediate the flanges 60,62. The height of the bracket part 64 corresponds to the elevation distance at which the housing 20 is mounted above the base 22.

The housing 20 together with the above-described means contained therein constitute a light-weight, i.e. on the order of three pounds, and a compact, i.e. on the order of 150 cubic inches in volume, laser scanning head. The workstation 10 supports itself on any flat support surface, and is fully portable from one location on the support surface 24 to another location thereon, or to any other support surface.

Figure 3:
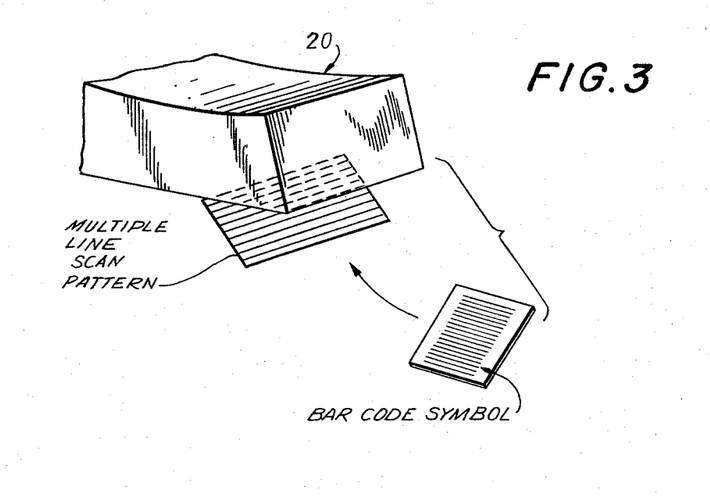
FIG. 3 is a diagrammatic representation of the multiple line scan pattern located in a scanning field generated by the laser scanning workstation of FIG. 1.

As best shown in FIG. 3, the scanning field at the reference plane measures about 3¼" in length along the field of view and about 1½" in height in direction perpendicular to the lengthwise direction. The scanning means 44 generates a multiple line scan pattern utilizing a single scan element, as described below in connection with FIGS. 15 and 16. The multiple line scan pattern comprises a plurality of scan lines which extend lengthwise along the field of view and which are spaced mutually apart of each other in the direction perpendicular to the lengthwise direction. The depth of focus measures about 2" between the bottom wall 30 of the housing and the reference plane. The reference plane is located at least 2", and preferably about 3" to 4", away from the bottom wall 30. An object to be scanned is located underneath the head and above the base anywhere in the vicinity of the reference plane to obtain accurate scan data.

Many different types of objects can be scanned at the workstation 10. In a preferred medical application used in bloodbank distribution centers, a soft-packaged object such as a blood bag 69 is scanned. The blood bag is a bag which contains human blood, and bears several bar code symbols to respectively denote, inter alia, the collection data, the unit number, the blood type, the product code and the collection center. Typically, some of the bar code symbols are arranged in one row, whereas the other symbols are arranged in another row, or on different rows on the bag.

The object 69 is manually oriented by the handler to have all of its bar code symbols facing towards the handler, i.e. facing away from the base 22. The objects with face-up symbols are then manually passed underneath the outlet port 48 through which the exiting laser light beam is directed in a generally downward direction towards the base. The handler visually registers the bar code symbols with the laser light beam so that the symbols can be read from overhead.

In order to facilitate the handler's visual sighting of the symbols and their registration with the laser light beam, a viewport 70 is formed on the front wall 32. As considered along a direct line of sight which extends from the viewer to the object 69, the viewport 70 is located between the outlet port 48 and the viewer. No obstructions are mounted within the housing at the region between the viewport 70 and outlet port 48 which would otherwise block the handler's view.

To protect the viewport and outlet port, a protective covering means or shield 72 covers the viewport and outlet port. The shield 72 is light-transmissive to permit an unobstructed view of the bar code symbols on the object 69. The shield is constituted of a one-piece scratch-resistant plastic. In use, the handler sometimes drags the blood bag 69 across the shield 72. Hence, the shield 72 is formed to be free of any sharp edges which might otherwise puncture the bag 69. The shield is detachably mounted on the head for cleaning and/or maintenance purposes.

In use, the handler inserts the bag 69 into the workstation to register and scan the symbols located on the first row, and thereupon the handler inserts the bag 69 even deeper into the workstation to register and scan the symbols located in the other rows. The internal program of the microcomputer 54 is programmed to combine the data from these bar code symbols which are entered in the system in the above-described format.

Figure 4:
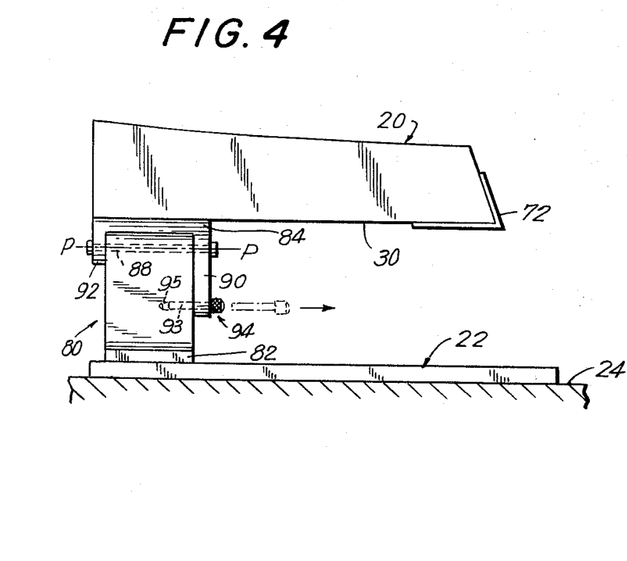
FIG. 4 is a front view of another embodiment of a stand-alone, desk-top laser scanning workstation having a movable laser scanning head.
Figure 5:
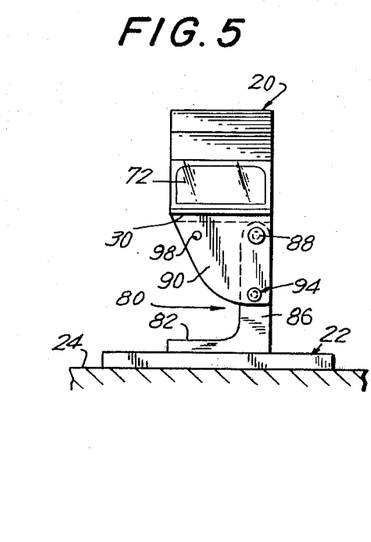
FIG. 5 is a right side view of the workstation of FIG. 4 with its head in an overhead scanning position.
Figure 6:
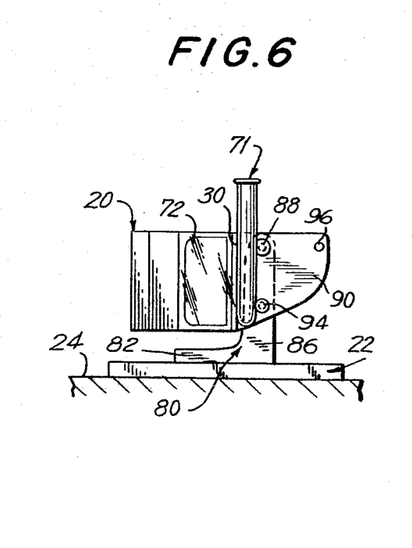
FIG. 6 is a right side view of the workstation of FIG. 4 with its head in a sideways scanning position.

Turning now to FIGS. 4, 5 and 6, the head 20 is mounted on the support base 22 by a modified mounting bracket 80 which permits the handler to move the head relative to the base. The mounting bracket 80 includes a base flange 82 fixedly connected to the base, a head flange 84 fixedly connected to the head, and an upright part 86 extending vertically between the flanges 82,84.

The head flange 84 is pivotally mounted on the upright bracket part 86 for turning movement about the pivot axis P—P. Specifically, an elongated pin 88 extends through a clearance hole formed in the front part 90 of the head flange 84, and thereupon through a clearance hole formed through the bracket part 86, and thereupon through a clearance hole formed through the rear part 92 of the head flange 84.

In operation, the handler pivots the head about the pivot axis P—P to assume either the first scanning position shown in FIG. 5 or the second scanning position shown in FIG. 6. In the first scanning position, the outlet port formed in the bottom wall 30 faces towards the base and directs the exiting laser light beam generally downwardly towards the base for overhead reading of the bar code symbols. In the second scanning position, the outlet port formed in the bottom wall 30 faces laterally away from the base. Put another way, the bottom wall is generally perpendicular to the base. In this latter case, the outlet port directs the exiting laser light beam in a direction generally parallel to the base for sideward reading of the bar code symbols.

In a preferred medical application, blood bags 69 are scanned when the head is in the overhead reading position of FIG. 5; and test tubes 71, which require an upright orientation, are scanned when the head is in the sideward reading position of FIG. 6.

The head is maintained and locked in either one of the aforementioned scanning positions by locking bolt 94 which respectively cooperates with either bolt hole 96 or bolt hole 98. Bolt holes 96,98 are formed in the front part 90 of the head flange 84. Bolt holes 96,98 are equidistantly radially spaced from the pivot axis P—P. Each bolt hole receives the pin 93 of the locking bolt 94 with slight clearance. A bolt bore 95 is formed in the bracket part 86 and respectively registers with either bolt hole.

In use, the handler inserts the locking bolt 94 through the bolt hole 96 and into the bore 95 to fixedly secure the head in its FIG. 5 position. To move the head to the FIG. 6 position, the handler removes the locking bolt 94 from bolt hole 96, thereupon pivots the head about the pivot axis until the bolt hole 98 registers with the bore 95, and then inserts the locking bolt 94 through the bolt hole 98 and into the bore 95. The reverse procedure is performed to return the head to the FIG. 5 position.

Figure 7:
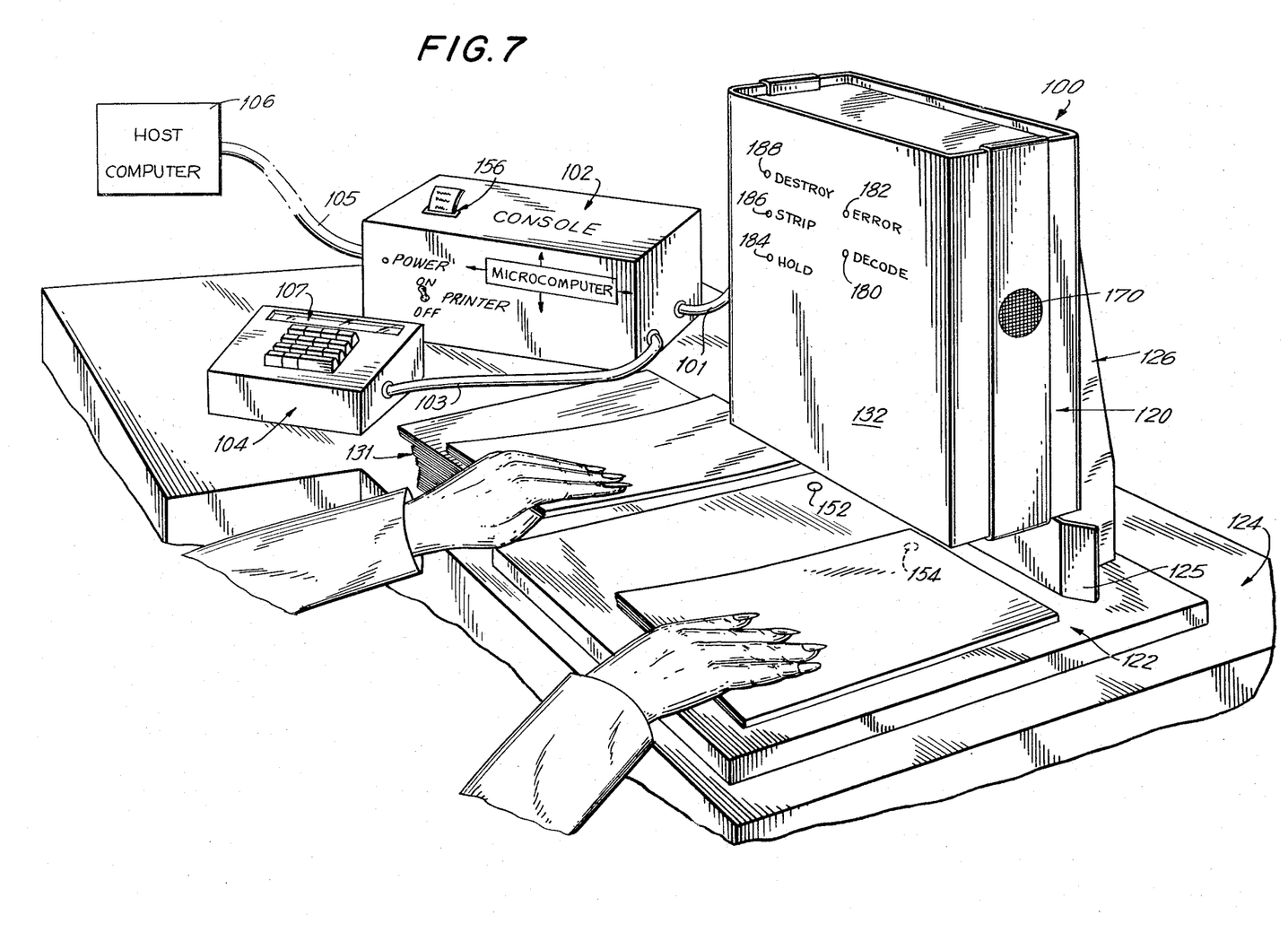
FIG. 7 is a part-perspective, part-schematic view of another laser-based data acquisition terminal of a laser scanning system including another embodiment of a stand-alone, desk-top laser scanning workstation particularly well suited for processing coded magazines in accordance with this invention.

Another laser scanning system is shown in operation in FIG. 7 and includes a portable, stand-alone, desk-top laser scanning workstation 100, a desk-top microcomputer console 102 electrically connected to the workstation 100 by cable 101, a desk-top manual data entry device 104 electrically connected to the console by cable 103, and a host computer 106 electrically connected to the console by cable 105. The FIG. 7 system is particularly well suited for processing objects such as magazines, although the invention is not intended to be limited only to magazines, because it will be readily appreciated that other objects such as books, newspapers, airline tickets, etc. can also be processed through workstation 100. The operation of workstation 100 is described in connection with magazine processing for exemplary purposes only.

The workstation 100 includes a light-weight, compact housing or laser scanning head 120, a planar base 122 mounted on a support surface 124 such as a counter-top, and a mounting bracket 126 (see FIG. 9) for mounting the head 120 on and at a predetermined elevation above the base.

The same basic head components described previously as being mounted in the head 20 are also mounted within the head 120. Thus, the head 120 contains a miniature light source means, optic means, scanning means, sensor means, signal processing means, all of which function basically in the manner described above. As will be described below in connection with FIG. 14, the scanning means within the head 120 generates a bi-orthogonal L-shaped scan pattern, rather than the aforementioned multiple line pattern generated by the scanning means 44.

The bottom wall 130 of the housing is formed with an outlet port through which the exiting laser light beam is emitted. The outlet port faces an upper work surface 123 of the substantially planar base plate 122, and directs the exiting laser light beam generally downwardly towards the work surface 123. The bottom wall 130 is spaced about 2"–4" above the upper work surface 123. The work surface 123 supports the objects during their passage through the workstation. The rear guide rail 125 is also mounted on the support base 122 rearwardly of the head, and provides an abutment surface against which the objects are guided during their passage through the workstation.

As shown in FIG. 7, a supply stack 131 of magazine is provided at the left side of the workstation for processing therethrough. The magazines are oriented to have their respective bar code symbols face upwardly away from the base, i.e. towards the handler.

Thereupon, the magazines are manually passed underneath the head 120 to the right side of the workstation. The bar code symbol is fully visible to the handler all during the passage of the magazine through the workstation, thereby facilitating the registering of the bar code symbol with the emitted laser light beam. The magazines are fed through the workstation at a throughput rate of about one magazine per second. Both of the handler's hands are free to manually feed the magazines. After processing is completed, the processed magazines are disposed of in the manner described below.

The magazines can be fed underneath the head 100 from either the right or the left side of the workstation to accommodate both right- and left-handed handlers. Hence, bi-directional object sensing means 150 (FIG. 8) are located at the workstation for determining the entry of an object to be scanned into the workstation from either side thereof. Scanning of the object is initiated upon its detection by the object sensing means 150.

Figure 8:
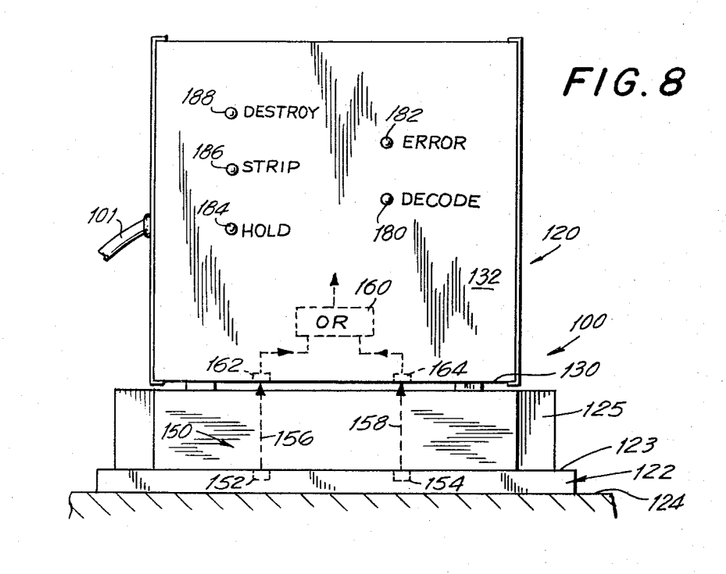
FIG. 8 is a part-schematic, front view of the laser scanning workstation of FIG. 7.

The bi-direction object sensing means includes two light-transmitter means 152,154, preferably light-emitting diodes, which are mounted in spaced-apart relationship on the base plate 122. Each diode 152,154 generates an infra-red light beam 156,158 and transmits the same upwardly from the base toward two corresponding light-receiver means, preferably photo-detectors 162,164, which are mounted in spaced-apart relationship on the bottom wall 130 of the head. Transmitter 152 and receiver 162 constitute one object sensor pair, and transmitter 154 and receiver 164 constitute another object sensor pair.

The receivers 162,164 generate high or low magnitude electrical output signals in dependence upon detection of the presence or absence of infra-red light energy on the receiver cells. The output signals are fed to a dual input OR logic gate 160 whose output is electrically connected to the host computer.

Before an object enters the workstation, the transmitters 152, 154 transmit the infra-red light beams 156,158 directly across the path of the objects through the workstation. Both receivers 162, 164 detect the presence of infra-red light energy on their receiving cells, and therefore, no output control signal is generated at the output of the OR-gate 160.

If an object enters the workstation and interrupts transmission of either light beam 156 or 158, then the receiver corresponding to the interrupted light beam detects the absence of infra-red light energy on its receiving cell, whereas the other receiver continues to detect infra-red light energy on its respective call. Therefore, an output control signal is generated at the output of the OR-gate 160. The output control signal is fed to the microcomputer contained in the console 102 to inform the system that an object is present in the workstation, and that scanning of the object can commence.

The object sensor pairs are spaced apart of each other at a distance which is smaller than the dimension of the object, as considered in the direction of passage through the workstation. The object sensor pairs generally bound the scanning field surface area which typically measures about 3"×3". This assures that at least one infra-red light beam will always be interrupted during passage of the object. Once a magazine has entered the scanning field by interrupting one of the infra-red light beams, then one and only one output control signal will be generated, thereby assuring that only one object will be scanned until both object sensor pairs are again uncovered. Scanning for another object cannot occur until both sensor pairs are first uncovered, and then only when one of the sensor pairs is again covered.

After the object has been successfully decoded by the microcomputer, the data descriptive of the bar code symbol may be stored in the host computer 106 for bookkeeping and/or inventory control purposes. If desired, the data can be recorded in tangible form by the paper printer 156, which is mounted on console 102, under the control of the microcomputer.

Auxiliary data may be entered into the system by the keyboard or manual data entry means 104. The handler can manually enter the digits representing the bar code symbol in the event that the latter has not been successfully decoded, or if desired, the handler can manually enter control data for advising the host computer to update its accounting records. For example, the handler typically must enter a source identifying number which characterizes the dealer from which the magazine came. Furthermore, the handler may wish to advise the system that a plurality of identical magazines are to be processed. Manual entry of the number of identical magazines obviates the need to scan the plurality of magazines, one at a time. The keyboard 104 is likewise under control of the microcomputer.

A display 107 is associated with the keyboard 104 to provide a visual indication of the numerals and/or control information to be entered into the system. The display 107 is also under microcomputer control.

After processing, the microcomputer and/or the host computer 106 generate output signals to advise the handler of the current status of the system operation. For example, decode indicator means or lamp 180 is operative to visually advise the handler that the just-scanned object has been successfully decoded. Error indicator means or lamp 182 is operative to visually advise the handler that a data entry error has occurred; e.g., the returned magazine is one which was not distributed to the particular keyed-in dealer source. Both the decode lamp 180 and error lamp 182 are mounted on the front wall 132 of the head 120 in full view of the handler.

Other indicator lamps are also mounted on the head 120, and advise the handler to take certain actions which are of particular interest in the processing of magazines which have been returned to the publisher from the dealers for credit. Hold indicator means or lamp 184 visually advises the handler to hold the just-scanned magazine for credit validation. Strip indicator means or lamp 186 visually advises the handler to strip the magazine cover off the magazine for credit validation. Destroy indicator means or lamp 188 visually advises the handler to destroy the magazine.

Figure 9:
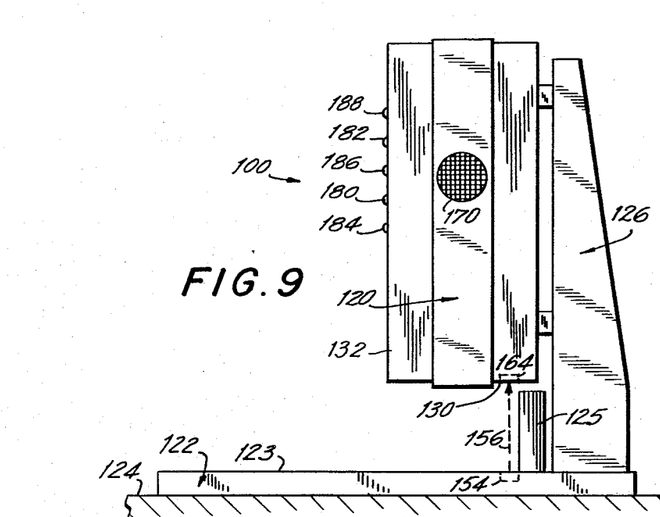
FIG. 9 is a right side view of the laser scanning workstation of FIG. 8.

As best shown in FIG. 9, auditory-indicator means or speaker 170 is also mounted at the workstation to auditorily advise the handler as to which of the indicator lamps are lit. To differentiate between the lamps, different level tones and different tonal sequences are employed.

All of the above-described visual and/or auditory annunciators are preferably mounted on the head, but can equally well be mounted remotely from the head. The annunciators are controlled by the microcomputer.

Figure 11:
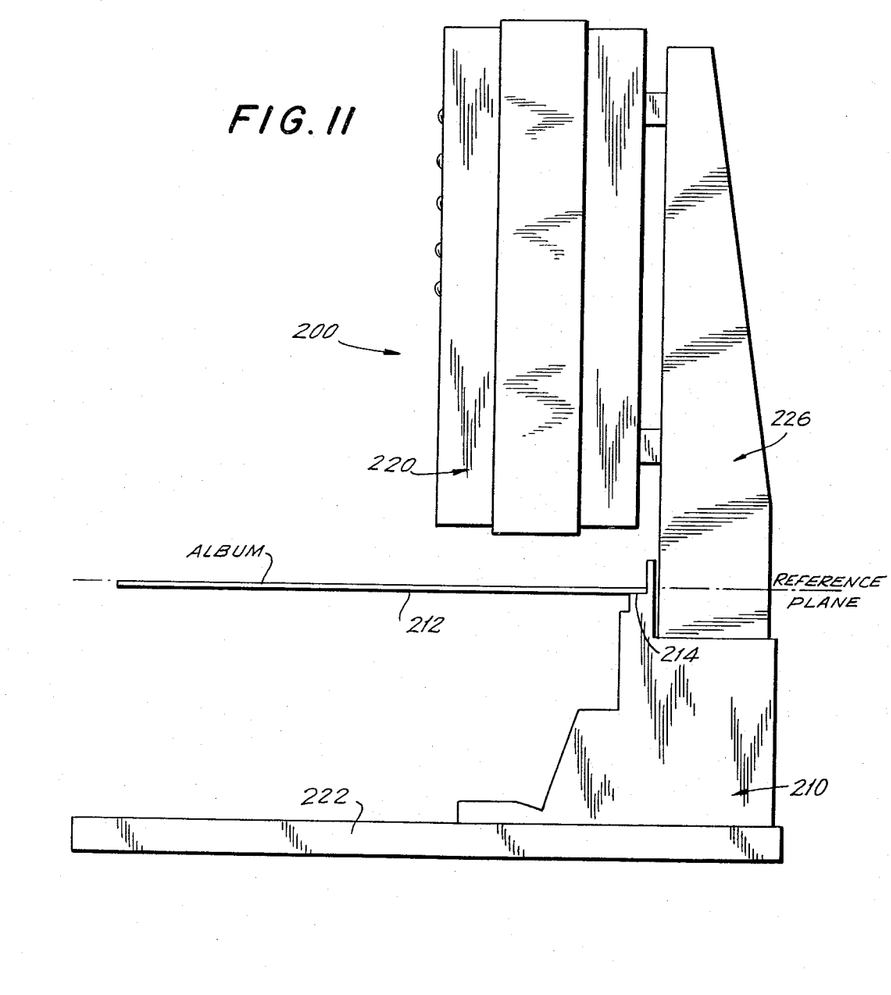
FIG. 11 is a right side view of another embodiment of a laser scanning workstation particularly well suited for processing coded record albums, tape cassettes, and tape cartridges, and shows the processing of a record album.
Figure 12:
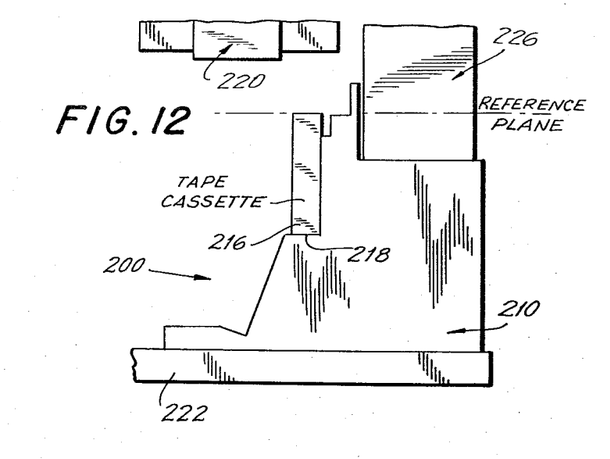
FIG. 12 is analogous to FIG. 11, and shows the processing of a tape cassette.
Figure 13:
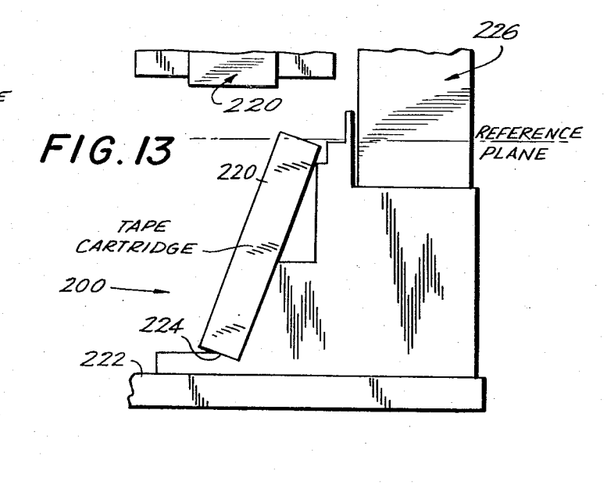
FIG. 13 is analogous to FIG. 11, and shows the processing of a tape cartridge.

FIGS. 11, 12 and 13 illustrate a portable, stand-alone, desk-top laser scanning workstations 200. Workstation 200 is basically the same as workstation 100, except that it has been modified to process phonograph albums, tape cassettes and tape cartridges, rather than magazines. It will be recognized that these entertainment industry-related objects have their bar code symbols located at too widely dispersed heights to accommodate the optimal depth of focus range for a laser scanning head whose height relative to the support surface is fixed. It is therefore necessary to adjust the height of the base so as to locate the bar code symbols of each of these differently-sized objects in the vicinity of the reference plane which is located about 2" below the outlet port of the housing.

A stepped guide member 210 is mounted on the support base 222 which supports the head 220. The stepped guide member is formed with a plurality of object-supporting surfaces operative for positioning the bar code symbols of differently-sized objects in the vicinity of the reference plane.

For example, the planar record album 212 in FIG. 11 is supportably guided in horizontal orientation on an upper object-supporting surface 214 which is elevated at a given elevation above the base 222. The parallelepiped-shaped tape cassette 216 in FIG. 12 is supportably guided in vertical orientation on an intermediate object-supporting surface 218 which is elevated at an elevation which is less than said given elevation. The larger parallelepiped-shaped tape cartridge 220 in FIG. 13 is supportably guided in a tilted orientation on object-supporting surfaces 224 and 226 which are both below the intermediate surface 218. Inclined surfaces 224 and 226 extend at right angles to each other.

In all of the above three cases, the symbol on the particular object is always positioned in the vicinity of the reference plane. The depth of focus is still in the neighborhood of 2" so that the placement of the symbol within this 2" region assures accurate scanning.

All of the workstations described above are interconnected in a desk-top console 12, 102 in which the microprocessor-based microcomputer control means 54 is housed. The microcomputer 54 provides the laser-based scanner system with the intelligence normally found in key-entry type data terminals. Specifically, the microcomputer 54 controls the symbol decode electronics, as well as a variety of peripheral system components such as the printer device 56, 156; the keyboard device 104; the data display 107; the audio annunciator 170; the visual annunciators 180,182,184,186,188; the bi-directional object sensor circuitry 150; and a non-illustrated general purpose communications terminal. In addition to controlling the physical hardware for these peripheral components, the microcomputer 54 can control the logic circuitry behind the way in which these peripheral components are utilized by simple programming changes. This allows the workstation to be used as an intelligent laser-based data acquisition terminal which can be easily programmed to interface in a variety of host computer situations. The microcomputer 54 establishes two-way communication with the host computer and acts as a traffic controller for the accounting records stored in the host computer.

Figure 10:
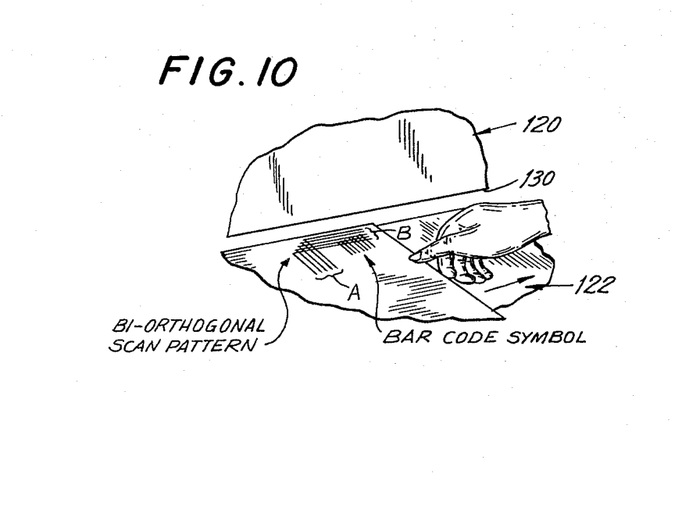
FIG. 10 is a perspective view of the bi-orthogonal scan pattern generated at the laser scanning workstation of FIG. 7.

As noted above, the scanning means 44 in workstation 10 generates the multiple line scan pattern depicted in FIG. 3. The scanning means in workstation 100 also generates a multiple line scan pattern, which is L-shaped as depicted in FIG. 10. In both cases, the multiple scan lines are generated by laser light reflecting off a single star-shaped rotary scan element 300, as shown in operation in workstation 100 in FIG. 14, and in isolation in FIGS. 15 and 16.

Figure 15:
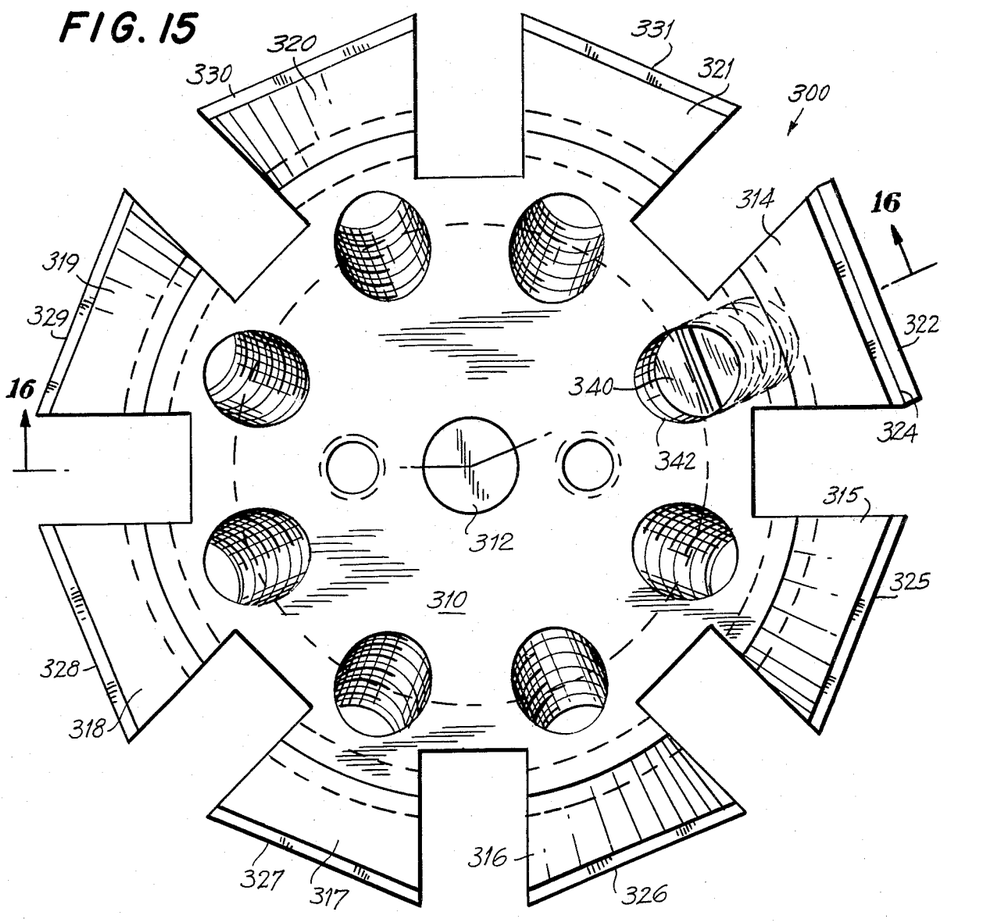
FIG. 15 is an enlarged top plan view of the scan element for generating the multiple line scan patterns in accordance with this invention.
Figure 16:
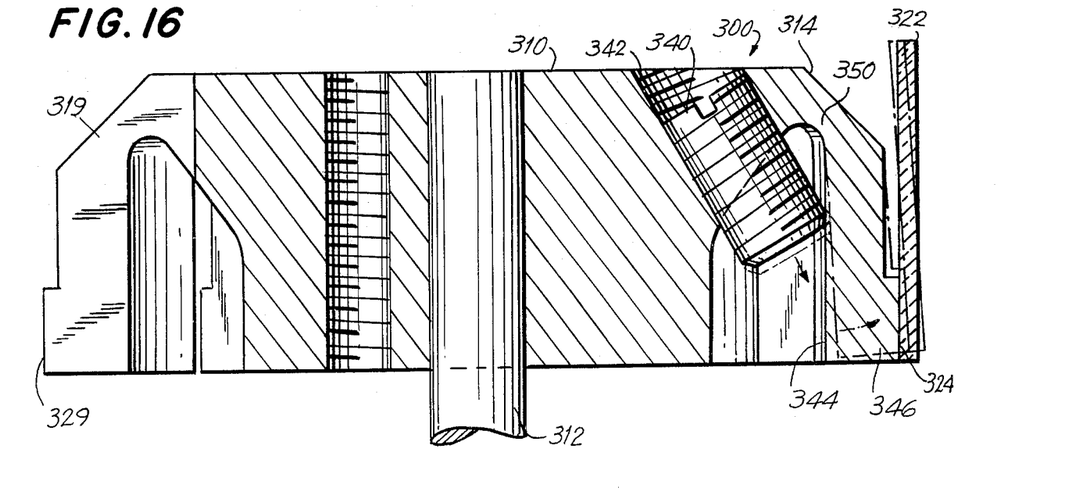
FIG. 16 is a sectional view as taken on line 16—16 of FIG. 15.

Scan element 300 is a one-piece structure having a hub portion 310 mounted on a scanning motor drive shaft 312 for joint rotation therewith about the axis of rotation R—R. A plurality of radially-extending extension portions 314-321 are integrally connected to the hub portion, and are circumferentially spaced from each other, to provide a generally star-shaped configuration for the scan element. Each extension portion has a respective exterior planar surface 324-331. Each planar surface may either be polished to reflect light, or coated with a light-reflective material, or, in a preferred embodiment, have a light-reflecting member such as a planar mirror mounted thereon. In order to simplify the drawings, only one planar mirror 322 is shown mounted, preferably by adhesion, on the planar surface 324 of representative extension portion 314. It will be understood that each planar surface is provided with its own mirror.

If a fixed laser light beam is now directed upon the mirrors of the scan element 300, then each mirror will reflect a single scan line. If it is assumed that all the mirrors lie in planes which extend in the axial direction, i.e. the plane of each mirror forms a zero degree angle relative to the axis of rotation R—R, then all of the generated scan lines will be superimposed one above another at the reference plane exteriorly of the laser scanning head. Put another way, there is no Y-axis scanning in a direction perpendicular to the scan lines which extend along the X-axis, because all the scan lines are juxtaposed one above another.

This invention achieves multiple scan lines mutually spaced from and parallel to each other along the Y-axis by deliberately moving the mirrors to tilted orientations such that the planes of the mirrors now form different angles of inclination relative to the axis of rotation. Each mirror is pre-set at its own different angle of inclination so that the scan lines will not be juxtaposed one above another.

Each mirror is separately pre-set to its own angle of inclination by its own adjusting member. For example, representative mirror 322 is set by adjusting member 340 which, in a preferred embodiment, is a set screw threadedly mounted in a tapped hole 342 which extends at about a 60° angle relative to the axis of rotation. The tapped holes are equi-angularly spaced about the axis of rotation on the hub portion 310. Each set screw is continuously movable in its respectively inclined tapped hole such that the leading end of the set screw abuts the rear surface of the mirror-mounting portion of the extension portion.

In order to pre-set the position of each mirror, each set screw is turned through the requisite extent necessary in order to first abut the aforementioned rear surface of the mirror-mounting portion, and thereupon the turning is continued until the set screw stresses the mirror-mounting portion and actually pushes the latter about an axis which extends perpendicularly to the axis of rotation. As best shown in FIG. 16, the leading end of set screw 340 abuts the rear surface 344 of the mirror-mounting portion 346 on which the mirror 322 is mounted. Upon further turning of the set screw 340, the mirror-mounting portion 346 is stressed outwardly, and the mirror 322 is moved in the direction of the curved arrows in FIG. 16. The angle of inclination of the tapped hole permits the adjuster to exert a large mechanical advantage for adjusting the mirror.

Each mirror-mounting portion is hingedly connected to the hub 310 by a hinge portion. For example, mirror-mounting portion 346 is integrally connected to hub 310 by hinge portion 350. The thickness of hinge portion 350 is selected to be thick enough to withstand the centrifugal forces which develop during rotation of the scan element, but thin enough to yield to the desired extent necessary to permit the mirror to assume its tilted position. For a given structural material of the scan element, the modulus of elasticity must never be exceeded during the adjustment of the mirrors. As for the mirror-mounting portion, the thickness thereof must be thick enough to withstand distortion.

In a preferred application, the Y-axis scanning field measures about $\frac{1}{2}$" at the reference plane, and the mirrors are positioned in an adjustment range from zero degrees to about two and one-half degrees relative to the rotation axis. For the workstation 10, we prefer to use a scan element having eight mirrors; hence, each mirror is incrementally spaced in angular steps of about 0.2°. For the workstation 100, we prefer to use a scan element having twelve mirrors; hence, each mirror is incrementally set for angular steps of about 0.3°. The mirrors do not have to be set in sequential order as considered along the circumferential direction.

The scan element 300 is of miniature size, on the order of one inch in diameter. The one-piece construction of the scan element permits it to be miniaturized. The miniature size and corresponding low weight permits it to be mounted within a compact laser scanning head positioned above a base. With the mirrors in place, the scan element resembles a polygon.

As noted above, FIG. 10 depicts the bi-orthogonal scan pattern generated by the scanning means located within the head of the workstation 100. Details of the bi-orthogonal scanning means are shown in FIG. 14.

The bi-orthogonal scan pattern is generally L-shaped and is constituted of two scanning sections A and B. The scan rate is about 200 scans per second. Each scanning section is composed of multiple scan lines which are spaced apart in mutual parallelism. The scan lines of scanning section A include an angle of about 80° with the scan lines of scanning section B. One scanning section or the other can be used to scan the symbol depending upon the orientation of the latter. Within certain industry guidelines, the symbol can be located up the magazine spline, or along an edge perpendicular to the spline. The symbol is differently oriented in both cases. The bi-orthogonal scan pattern assures that the symbol will be read by one or the other of its scanning sections. The magazines can therefore all be passed through the workstation with the same orientation and hand motion, without requiring any pre-sorting.

Figure 14:
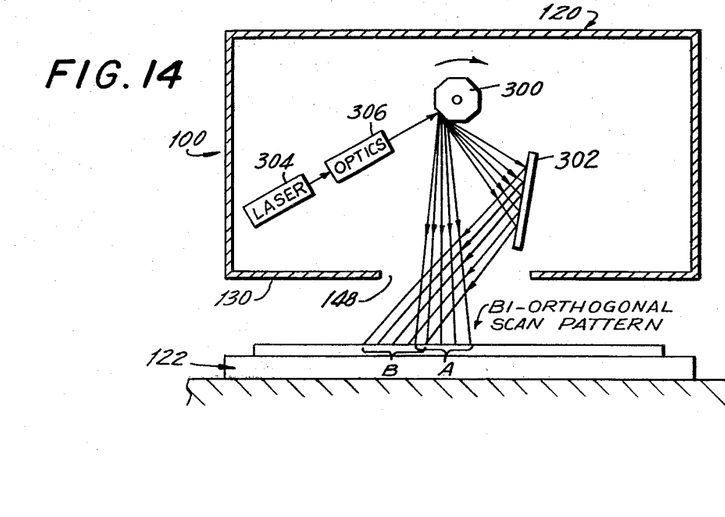
FIG. 14 is a diagrammatic view of the scanning circuitry used to generate the bi-orthogonal multiple line scan pattern of FIG. 10.

As shown in FIG. 14, the bi-orthogonal scan pattern is generated by the single star-shaped scan element 300 (see FIGS. 15, 16) which cooperates with a single fixed reflecting planar mirror 302 which is oriented at a particular location and orientation relative to the support base 122. Specifically, a laser-generating source 304 is mounted in the housing 120 which is mounted above the base 122. The laser light beam is directed towards an optical train 306 which directs the laser light beam to the scan element 300. Some of the laser light reflected off the scan element 300 is directly conducted through the outlet port 148 which is formed in the bottom wall 130 of the housing 120. This unobstructed laser light beam impinges directly on the object being scanned and forms the scan lines of the first scanning section A.

The reflecting planar mirror 302 is fixedly mounted within the housing in a skew manner relative to the base and to the respective planes of the mirrors mounted on the scan element 300. The reflecting mirror 302 is located in a portion of the reflected light path which is unused for generating the first scanning section A. The mirror 302 reflects the scanning laser light beam in the unused path portion through the outlet port 148 and thereby forms the scan lines of the second scanning section B.

Figure 17:
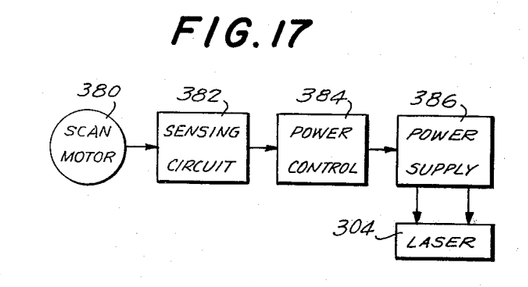
FIG. 17 is a block diagram of the laser shut-down safety circuit in accordance with this invention.

Turning now to FIG. 17, a safety circuit for the laser is illustrated. In the event that the scanning motor for driving the scan element 300 malfunctions, or if the drive circuitry for the scanning motor malfunctions, the possibility exists that the laser light beam will not be emitted from the scanning head, or will be swept slower than normal. The FIG. 17 circuit prevents this possibility of an object going unscanned, or from being scanned too slowly, by removing power from the laser in the event of the above-described system malfunction conditions.

Essentially, the voltage which is self-generated by the scanning motor itself during normal operation is detected. In case the amplitude and/or the frequency of the motor-generated voltage drops, the safety circuit shuts the laser off.

The safety circuit comprises a sensing circuit for detecting the voltage generated by the scanning motor 380 itself. The sensing circuit can be either a frequency dependent or voltage dependent switching circuit. The input of the sensing circuit 382 is connected directly to the motor windings, and the output is connected to the control terminal of a power control device 384, such as a triac, a solid-state relay or a mechanical relay. The power control device 384 is connected to the power supply 386 of the laser 304, and is operative to control the power supply 386 to enable or disable the laser in dependence upon the output of the sensing circuit 382.

The safety circuit is preferably completely mounted within the laser scanning head, although in some applications, for example workstation 100, the power supply 386 is preferably mounted within the console, rather than in the head.

The determination of the proper functioning of the scanning motor by detecting the self-generated voltage across the motor windings is advantageous, because it requires no encoders or tachometers to be connected to the motor.

It will be understood that each of the elements described above, or two or more together, may also find a useful application in other types of constructions differing from the types described above.

While the invention has been illustrated and described as embodied in a portable, stand-alone, desk-top laser scanning workstation for an intelligent data acquisition terminal and method of scanning, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a laser scanning system, a portable, stand-alone, desk-top, laser scanning workstation for reading bar code symbols on objects passing through the workstation, comprising:
 (a) a single housing having wall portions bounding an outlet port;
 (b) miniature light source means mounted within the housing, for generating a laser light beam;
 (c) miniature optic means mounted within the housing, for directing the laser light beam along a light path through the outlet port and towards a bar code symbol which is located in the vicinity of a reference plane that is located exteriorly of the housing;
 (d) miniature scanning means mounted in the light path and within the housing, for cyclically sweeping the laser light beam across the bar code symbol for reflection therefrom;
 (e) miniature sensor means mounted within the housing, for detecting the intensity of light reflected from the bar code symbol, and for generating an electrical signal indicative of the detected intensity of the reflected light;
 (f) miniature signal processing means mounted within the housing, for processing the electrical signal to generate therefrom a processed signal descriptive of the bar code symbol;
 (g) all of said miniature light source means, optic means, scanning means, sensor means, and signal processing means together with said housing constituting a light-weight, compact laser scanning head;

(h) a base located exteriorly of the housing and mountable on a support surface; and (i) means for mounting the head on the base to constitute a laser scanning workstation which supports itself on the support surface and which is portable as a unit from one location to another, said head being mounted at a predetermined elevation above the base to permit the user to view the bar code symbol from above the same, and to position the bar code symbol in the light path of the laser light beam exteriorly of the outlet port during passage of the object through the workstation.

2. The desk-top laser scanning workstation of claim 1, wherein one of the housing wall portions is a bottom wall portion which is juxtaposed with and faces the base; and wherein said oulet port is formed in the bottom wall portion and directs the exiting laser light beam generally downwardly towards the base, for overhead reading of the bar code symbols.

3. The desk-top laser scanning workstation of claim 2, wherein another of the housing wall portions bounds a viewport located between the viewer and the outlet port; and further comprising means for covering the viewport and the outlet port, said covering means being transparent to permit overhead viewing of the bar code symbol to be scanned along a line of sight which extends from the viewer, through the viewport, and thereupon through the outlet port, and then to the bar code symbol.

4. The desk-top laser scanning workstation of claim 3, wherein said covering means is a scratch-resistant shield free of sharp edges to protect soft-packaged objects during their passage through the workstation.

5. The desk-top laser scanning workstation of claim 1, wherein said base is a substantially planar base plate in engagement with the support surface; and wherein said head-mounting means includes a base flange mounted on the base plate, a head flange mounted on the head, and an upright part intermediate the flanges.

6. The desk-top laser scanning workstation of claim 1, wherein said head-mounting means mounts the head for movement relative to the base between a first scanning position in which the outlet port faces towards the base and directs the exiting laser light beam generally downwardly towards the base for overhead reading of the bar code symbols, and a second scanning position in which the outlet port faces laterally away from the base and directs the exiting laser light beam generally parallel to the base for sideward reading of the bar code symbols.

7. The desk-top laser scanning workstation of claim 6; and further comprising means for locking the head in either one of said scanning positions.

8. The desk-top laser scanning workstation of claim 1, wherein said sensor means generates an electrical analog signal indicative of the detected intensity of the reflected light; and wherein said signal processing means includes analog-to-digital processing means for converting the analog signal to a digital processed signal; and wherein said system further comprises a desk-top console having processor means mounted therein and electrically connected to said signal processing means, for converting the digital processed signal to data descriptive of the scanned bar code symbol.

9. The desk-top laser scanning workstation of claim 8; and further comprising data recorder means mounted on the console and electrically connected to said processor means, for recording the data descriptive of the bar code symbol.

10. The desk-top laser scanning workstation of claim 8; and further comprising a host computer electrically connected to said processor means for establishing two-way electrical communication between the host computer and the processor means.

11. The desk-top laser scanning workstation of claim 1, wherein said head is spaced from the base, and wherein said reference plane is located underneath the head but above the base, and wherein the head bounds with the base a workspace through which objects may freely pass above the base without mechanical interference.

12. The desk-top laser scanning workstation of claim 1, wherein said scanning means generates a multiple line scan pattern which is cyclically swept along respective directions that are generally parallel and orthogonal to the direction of passage of the objects through the workstation.

13. The desk-top laser scanning workstation of claim 12, wherein said scanning means includes a single scan element for generating the multiple line scan pattern.

14. The desk-top laser scanning workstation of claim 13, wherein said scan element has an axis of rotation, and has a plurality of light-reflecting surfaces lying in planes which form different angles of inclination relative to the axis of rotation.

15. The desk-top laser scanning workstation of claim 1, wherein said base has a work surface for supporting the objects during their passage through the workstation; and wherein said outlet port faces the work surface and directs the exiting laser light beam generally downwardly towards the work surface, for overhead reading of the bar code symbols.

16. The desk-top laser scanning workstation of claim 15, wherein said head bounds a workspace with said work surface of the base, and wherein the objects are freely passed without mechanical interference through the workspace with their bar code symbols facing upwardly towards the outlet port for direct impingement with the exiting laser light beam.

17. The desk-top laser scanning workstation of claim 15; and further comprising means on the work surface of the base, for supportably guiding the objects during their passage through the workstation.

18. The desk-top laser scanning workstation of claim 15; and further comprising means on the work surface of the base, for positioning the bar code symbols of differently-sized objects in the vicinity of the reference plane.

19. The desk-top laser scanning workstation of claim 18, wherein said positioning means includes a stepped guide member having a lower object-supporting surface elevated a given distance above the base, and at least one upper object-supporting surface elevated above the base at a greater distance than said given distance.

20. The desk-top laser scanning workstation of claim 19, wherein the objects include a substantially planar phonograph record album, a parallelepiped-shaped tape casssette and a larger parallelepiped-shaped tape cartridge; and wherein each of these differently-shaped objects is supportably guided on different surfaces of the stepped guide member.

21. The desk-top laser scanning workstation of claim 1, wherein access to the outlet port on the housing is available from either side of the workstation; and further comprising bi-directional object sensing means at the workstation for determining entry of an object to be scanned into the workstation from either side thereof.

22. The desk-top laser scanning workstation of claim 21, wherein said bi-directional object sensing means includes two pairs of object sensors each pair comprising a light transmitter and a light receiver, said object sensor pairs being spaced apart at a distance less than the size of the object, as considered along the direction of passage of the objects through the workstation.

23. The desk-top laser scanning workstation of claim 22, wherein said bi-directional object sensing means includes means for generating a control signal whenever either object sensor pair detects entry of an object into the workstation.

24. The desk-top laser scanning workstation of claim 1; and further comprising decode indicator means at the workstation for indicating when an object has been successfully decoded.

25. The desk-top laser scanning workstation of claim 1; and further comprising error indicator means at the workstation for indicating that an error has occurred.

26. The desk-top laser scanning workstation of claim 1; and further comprising action indicator means at the workstation for indicating to the user the disposition to be taken for the just-scanned object.

27. The desk-top laser scanning workstation of claim 26, wherein the object to be scanned is a magazine or the like, and wherein the action indicator means comprises destroy indicator means for destroying the magazine, hold indicator means for storing the magazine, and strip indicator means for stripping the magazine cover off the magazine.

28. The desk-top laser scanning workstation of claim 1; and further comprising manual data entry means operatively connected to the workstation, for manually entering auxiliary data into the system.

29. The desk-top laser scanning workstation of claim 28; and further comprising data display means operatively connected to the workstation, for visually displaying the data.

30. The desk-top laser scanning workstation of claim 1, wherein said scanning means generates a bi-orthogonal scan pattern.

31. The desk-top laser scanning workstation of claim 30, wherein said bi-orthogonal scan pattern has two scanning sections which together assume a generally L-shaped configuration.

32. The desk-top laser scanning workstation of claim 31, wherein said scanning means includes means for sweeping the laser light beam along a scanning path to generate the first scanning section of the bi-orthogonal scan pattern; and means in a portion of the scanning path which is unused for generating the first scanning section, for reflecting the laser light beam in the unused path portion through the outlet port to generate the second scanning section of the bi-orthogonal scan pattern.

33. The desk-top laser scanning workstation of claim 32, wherein said scanning means includes a single scan element for generating both scanning sections of the bi-orthogonal scan pattern, and wherein said reflecting means includes a mirror mounted on the housing in a skew manner relative to the base.

34. The desk-top laser scanning workstation of claim 32, wherein said scanning means includes a single scan element for generating both scanning sections of the bi-orthogonal scan pattern, said scan element being rotatable about an axis of rotation and having a plurality of light-reflecting surfaces lying in planes which form different angles of inclination relative to the axis of rotation, to thereby generate multiple scan lines for each scanning section.

35. The desk-top laser scanning workstation of claim 1; and further comprising laser safeguard means for detecting malfunction of said scanning means, and for preventing generation of the laser light beam upon detection of such malfunction.

36. The desk-top laser scanning workstation of claim 35, wherein said scanning means includes a drive motor having windings across which a self-generated voltage is established; and wherein said laser safeguard means detects changes in the self-generated voltage and thereupon disables the light source means from its power source.

37. A method of reading bar code symbols on objects to be scanned, comprising the steps of:
  (a) generating a laser light beam in a scanning head having a discharge port;
  (b) emitting the laser beam through the discharge port;
  (c) scanning the emitted laser beam across the symbols for reflection therefrom;
  (d) generating electrical signals indicative of the symbols being scanned in response to detection of the reflected light beam;
  (e) processing the electrical signals to data descriptive of the symbols being scanned;
  (f) mounting a base remotely from the head on a support surface;
  (g) mounting the head at a predetermined elevation above the base to thereby constitute a stand-alone, desk-top, laser scanning workstation;
  (h) orienting the objects to have their bar code symbols face away from the base and towards a handler;
  (i) passing the oriented objects through the workstation; and
  (j) registering the bar code symbols with the emitted laser beam during passage of the objects through the workstation.

38. The method as defined in claim 37, wherein said steps of orienting and passing the objects are performed manually, and wherein said registering step is performed by visually aligning the symbols with the laser light beam.

39. The method as defined in claim 37, wherein said head-mounting step mounts the head to direct the laser light beam generally downwardly towards the base, and wherein said passing step is performed by passing the oriented objects underneath the laser scanning head, for overhead reading of the bar code symbols.

40. The method as defined in claim 37, wherein said head-mounting step mounts the head for movement between a first scanning position in which the laser light beam is directed generally downwardly towards the base for overhead reading of the bar code symbols, and a second scanning position in which the laser light beam is directed generally parallel to the base for sideward reading of the bar code symbols.

41. The method as defined in claim 40; and further comprising the step of locking the head in either one of said scanning positions.

42. The method as defined in claim 37; and further comprising the step of positioning the bar code symbols of differently-sized objects at the same general location exteriorly of the laser scanning head.

43. The method as defined in claim 37; and further comprising the step of determining entry of an object to be scanned into the workstation in either direction of passage of the object through the workstation.

44. The method as defined in claim 37; and further comprising the step of indicating to a user when an object has been successfully decoded.

45. The method as defined in claim 37; and further comprising the step of indicating to a user that an error has occurred.

46. The method as defined in claim 37; and further comprising the step of indicating to a user the disposition to be taken for the just-scanned object.

47. The method as defined in claim 37; and further comprising the step of generating a bi-orthogonal scan pattern.

48. The method as defined in claim 47, when said pattern-generating step is performed by sweeping the laser light beam along a scanning path to generate a first scanning section of the bi-orthogonal scan pattern, and intercepting the laser light beam in a portion of the scanning path which is unused for generating the first scanning section, and concomitantly reflecting the laser light beam in the unused path portion to generate a second scanning section for the bi-orthogonal scan pattern.

49. The method as defined in claim 48, wherein said sweeping step is performed by using a single scan element, and wherein said reflecting step is performed by using a single light-reflecting element.

50. The method as defined in claim 49, wherein said sweeping step is performed by rotating the single scan element about an axis of rotation; and further comprising the step of generating multiple scan lines for each scanning section of the bi-orthogonal scan pattern by positioning light-reflecting surfaces in planes which form different angles of inclination relative to the axis of rotation.

51. The method as defined in claim 37 and further comprising the step of generating a multiple line scan pattern by using a single scan element.

52. A miniature scan element for generating a multiple line scan pattern, comprising:
(a) a rotary hub portion having an axis of rotation;
(b) a plurality of radially-extending extension portions of one-piece with the hub portion, each extension portion having a light-reflecting mounting portion and a hinge portion integrally connected between the hub portion and its associated light-reflecting mounting portion;
(c) a plurality of light-reflecting means each provided on a respective light-reflecting mounting portion for joint rotation with the hub portion, said light-reflecting means being spaced circumferentially about the axis of rotation, and lying in planes which form different angles of inclination relative to the axis of rotation, to thereby reflect a multiple line scan pattern when a light beam is directed towards the rotating light-reflecting means; and
(d) adjusting means for setting the positions of the light-reflecting means at said different angles of inclination, each hinge portion having a thickness dimension which is thick enough to resist centrifugal forces developed during rotation of the hub portion, but thin enough to resiliently yield during adjustment of the positions of the light-reflecting means.

53. The miniature scan element of claim 52, wherein said adjusting means is continuously adjustable.

54. The miniature scan element of claim 52, wherein each light-reflecting means includes a mirror mounted on its associated light-reflecting mounting portion.

55. The miniature scan element of claim 54, wherein said adjusting means bears against and moves each light-reflecting mounting portion in radially outward direction.

56. The miniature scan element of claim 55, wherein said adjusting means includes a plurality of threaded elements mounted in tapped holes extending through the hub portion at an angle of inclination relative to the axis of rotation.

57. A method of making a miniature scan element for generating multiple line scan patterns, comprising the steps of:
(a) forming a one-piece construction including a rotary hub portion having an axis of rotation, and a plurality of radially-extending extension portions, each extension portion having a light-reflecting mounting portion and a hinge portion integrally connected between the hub portion and its associated light-reflecting mounting portion;
(b) providing a plurality of light-reflecting means each on a respectively light-reflecting mounting portion, and spacing the light-reflecting means circumferentially about the axis of rotation;
(c) adjusting the positions of the light-reflecting means to lie in planes which form different angles of inclination relative to the axis of rotation; and
(d) forming each hinge portion with a thickness dimension which is thick enough to resist centrifugal forces developed during rotation of the hub portion, but thin enough to resiliently yield during adjustment of the positions of the light-reflecting means.

58. A method of generating a multiple line scan pattern, comprising the steps of:
(a) forming a one-piece scan element of a rotary hub portion having an axis of rotation, and a plurality of radially-extending extension portions each having a light-reflecting mounting portion and a hinge portion integrally connected between the hub portion and its associated light-reflecting mounting portion;
(b) mounting a plurality of light-reflecting means each on a respective light-reflecting mounting portion, and spacing the light-reflecting means circumferentially about the axis of rotation;
(c) adjusting the positions of the light-reflecting means to lie in planes which form different angles of inclination relative to the axis of rotation, each hinge portion being thin enough to resiliently yield during adjustment of the positions of the light-reflecting means;
(d) rotating about the axis of rotation the one-piece scan element, each hinge portion being thick enough to resist centrifugal forces developed during rotation; and
(e) directing a light beam at the light-reflecting means for reflection therefrom, and thereby sweeping the reflected light beam along a scanning path to generate a scan line for each light-reflecting means.

* * * * *